United States Patent
Cantu, II (10) Patent No.: US 8,537,986 B1
(45) Date of Patent: Sep. 17, 2013

(54) SYSTEMS AND METHODS FOR CUSTOMIZING MESSAGES

(75) Inventor: Jose Jesus Cantu, II, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1772 days.

(21) Appl. No.: 11/538,410

(22) Filed: Oct. 3, 2006

(51) Int. Cl.
  *G09B 23/28* (2006.01)
  *H04M 1/64* (2006.01)
  *H04N 13/02* (2006.01)

(52) U.S. Cl.
  USPC ..... 379/88.23; 348/46; 379/258; 379/265.02; 434/362; 709/202; 718/101

(58) Field of Classification Search
  USPC 379/265.05, 265.02, 265.09, 265.11–265.13, 379/258, 88.23; 709/218, 219, 202; 348/46; 434/362; 718/101
  See application file for complete search history.

(56) References Cited

U.S. PATENT DOCUMENTS

| | | | |
|---|---|---|---|
| 5,946,387 A * | 8/1999 | Miloslavsky | 379/265.12 |
| 6,363,411 B1 * | 3/2002 | Dugan et al. | 709/202 |
| 7,088,814 B1 * | 8/2006 | Shaffer et al. | 379/265.12 |
| 7,623,650 B2 * | 11/2009 | Dalton et al. | 379/265.01 |
| 7,672,444 B2 * | 3/2010 | Perrella et al. | 379/265.02 |
| 8,068,780 B2 * | 11/2011 | Cohen | 434/362 |
| 2001/0014145 A1 * | 8/2001 | Kamel et al. | 379/88.19 |
| 2005/0286709 A1 * | 12/2005 | Horton et al. | 379/265.09 |
| 2006/0074769 A1 * | 4/2006 | Looney et al. | 705/26 |
| 2007/0201636 A1 * | 8/2007 | Gilbert et al. | 379/88.14 |
| 2007/0239537 A1 * | 10/2007 | Protheroe et al. | 705/14 |
| 2007/0269031 A1 * | 11/2007 | Honig et al. | 379/142.01 |
| 2008/0119173 A1 * | 5/2008 | Nguyen | 455/414.1 |
| 2009/0024453 A1 * | 1/2009 | Fraser | 705/10 |
| 2009/0099836 A1 * | 4/2009 | Jacobsen et al. | 704/3 |
| 2009/0182616 A1 * | 7/2009 | Ho et al. | 705/10 |
| 2009/0307074 A1 * | 12/2009 | Sharma | 705/14.25 |
| 2010/0188485 A1 * | 7/2010 | Abrams | 348/46 |
| 2010/0191602 A1 * | 7/2010 | Mikkelsen et al. | 705/14.64 |

OTHER PUBLICATIONS http://telehold.com, (Aug. 18, 2006),1 p.
www.easyonhold.com, (2005),7 p.
http://www.marketingonholdusa.com/, (Oct. 3, 2006),1 p.
http://www.ohms.com/ohms.htm (Oct. 3, 2006),5 p.
"Custom Messaging on Hold Campaigns", http://voice.muzak.com/solutions/onhold/custom_messaging.aspx, (2006),2 p.
"On-Hold Music and Messages", http://www.business.com/directory/telecommunications/business_solutions/business_phone_systems/on-hold_music_and_messages/, (2006),8 p.
"Our Difference", http://www.onholdmarketing.com/ourdifference.htm, (Oct. 3, 2006),2 p.

* cited by examiner

*Primary Examiner* — Gerald Gauthier
(74) *Attorney, Agent, or Firm* — Brooks, Cameron & Huebsch, PLLC (57) ABSTRACT

Systems and methods for customizing messages are described. The apparatus may include an interaction engine to enable interactions between a customer and an agent, a user interface module to display a listing of life events and a life event engine to retrieve the listing from a data store. The method may include receiving a life event indication and playing one of a plurality of life event messages using at least the life event indication.

22 Claims, 8 Drawing Sheets

SYSTEMS AND METHODS FOR CUSTOMIZING MESSAGES

RELATED APPLICATIONS

1. Technical Field

This application relates to systems and methods that manage communications, and more particularly to systems and methods that manage interactions between customers and agents.

2. Background

Customers demand more of the products and services they use than ever before. They insist that the companies they deal with on a regular basis provide them greater and greater levels of information and access. These companies are configuring and operating more and more complex systems that are capable of delivering highly integrated services to those customers. One of them is that companies use to provide this enhancement in this through the use of one or more agents and call-center.

For example, a customer requiring access to insurance information can call into a call-center and through a conversation with an agent service that insurance account. Through the interaction between the customer and the agent changes to their insurance account can be made. However, during this interaction it may become necessary for the customer to be placed on hold. Typically these hold periods provide a less than ideal user experience to the customer. One response to this is to place more agents in a call center which can reduce the amount of time the customer waits for an agent to process them.

SUMMARY

In an embodiment a method of dynamically playing in message customized for a particular customer includes receiving a life event indication from a user during an interaction, playing a life event message selected from a plurality of life event messages using at least the life event indication. Playing the life event message may include, in some examples, selecting a life of event from a listing of life events using the life event indication and retrieving the life event message related to the life event. In an embodiment, a method of dynamically delivering customized messages to a customer includes selecting a life event message using at least an identifier associated with the customer and playing the selected life event message. In an embodiment an apparatus to dynamically deliver customized messages to a customer includes, and interface module to enable interactions between a customer and agent, a user interface module to display a listing of predetermined life events to the agent and a life event selector module to retrieve the listing of predetermined life events from a life event data store and to receive the life event indication from the user interface.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description of example embodiments, reference is made to the accompanying drawings, which form a part hereof and in which is shown, by way of illustration, specific embodiments in which the example method, apparatus, and system may be practiced. It is to be understood that other embodiments may be utilized and structural changes may be made without departing from the scope of this description.

The term "life event" is used herein to denote any event in the customer's life that has an effect on one or more financial products. Examples of such life events include, without limitation: permanent change of station, deployment, retirement, beginning college, birth of a baby, marriage, divorce, moving, purchase of a car, purchase of a house, completing college, change in employment, change in number of dependents, and the like. This list is meant only as an illustration and is not considered to be limiting in any manner, as any event that has an effect on one or more financial products is considered to be within the scope of the present discussion. Financial products, as used herein, include, without limitation: checking accounts, savings accounts, mortgages, certificates of deposit, credit cards, retirement accounts, life insurance accounts, health insurance accounts, brokerage accounts, mutual funds, equity lending accounts, auto insurance accounts, property insurance accounts, liability insurance accounts, commercial insurance accounts, commercial lending accounts, and the like Broadly, financial products include any product that the customer derives some present or future financial benefit from, or has some present or future liability. For example, in the case of auto insurance, the customer pays a periodic premium and in the event of an accident that results in the total loss of the auto, will receive a payment meant to compensate the customer for the loss of the auto.

Figure 1:
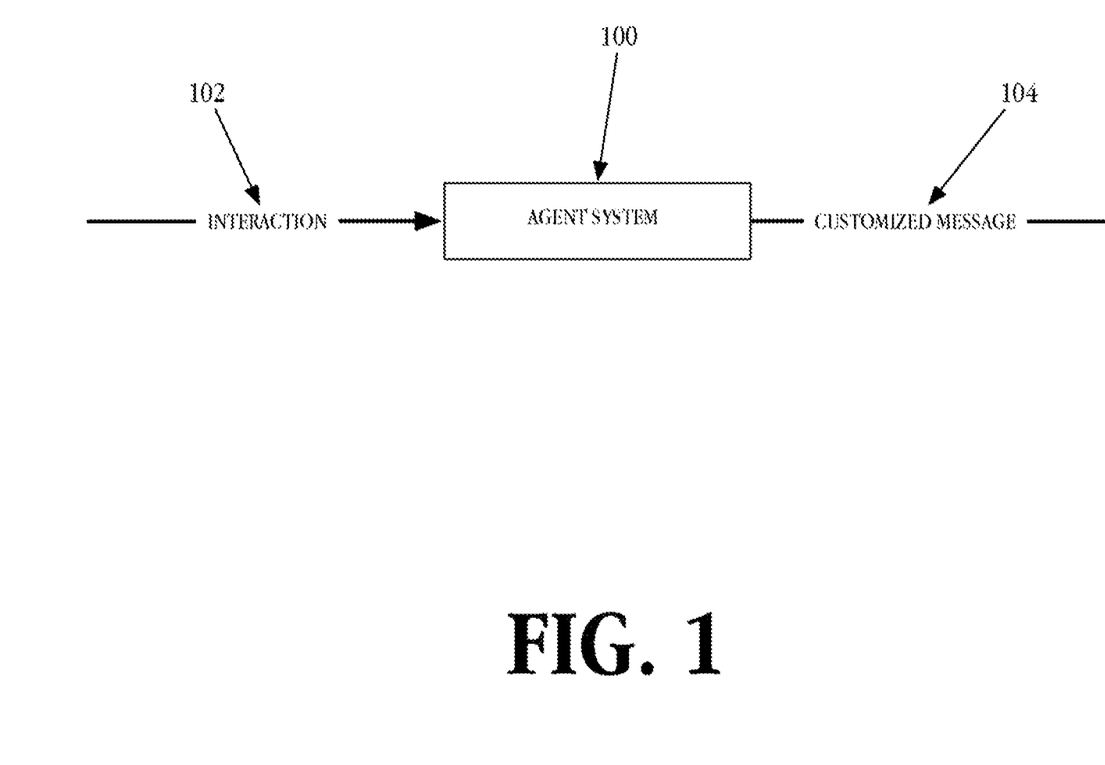
FIG. 1 shows a high-level block diagram of an apparatus for providing a customized message to a customer, in accordance with an example embodiment.

FIG. 1 shows a high-level block diagram of an apparatus for providing a customized message to a customer, in accordance with an example embodiment. In an embodiment, an agent system 100 receives an interaction 102 from a customer. In an alternative embodiment, the agent system 100 processes the interaction 102.

Interaction, as used herein, includes any communication with a customer that provides a bi-directional flow of information. Bi-directional, as used herein, is meant to denote a two-way flow of information such that the customer can query the agent for information and be provided that information in the same interaction.

Interactions may include, without limitation: an audio conversation enabled over a Public Switched Telephone Network (PSTN), an audio conversation enabled over a Voice-over-IP (VoIP) link, an audio/video conversation over any suitable video-conferencing system, a text chat conversation enabled through an instant messenger (IM) or short message service (SMS) system, or any combination thereof. Specific examples are merely intended to be illustrative and not limiting in any manner, as any system that provides a bi-direction flow of information from the customer to an agent is considered to be within the scope of the present discussion. Further, in the context of the present discussion, an interaction may be interrupted, during which time the interaction is suspended or is placed on hold. In some instances, the customer may merely wait for further information from the agent. However, this suspension may be used as an opportunity to inform the customer about other services that are offered or to provide entertainment to the customer, such as in the form of music.

In an embodiment, the agent system 100 is one of a plurality of agent systems deployed in a call center. A call center is a collection of one or more agents, each of which would be equipped with the agent system 100 of FIG. 1. Each of the agents is tasked with processing interactions with customers. As discussed above, during an interaction with a customer, the agent may be required to place the customer on hold for any variety of reasons, such as acquiring information from other agents about the customer or the service. During this on hold time, the agent system 100 is configured to output a customized message 104, which is played to the customer during the on hold time.

In one embodiment, the agent, during the interaction with the customer, may identify that one or more life events have occurred for the customer. Prior to placing the customer on hold, the agent can select the life event from a listing of life events. Once placed on hold, the agent system 100 can retrieve a life event message from a data store and play the life event message as the customized message 104 described above.

Figure 2:
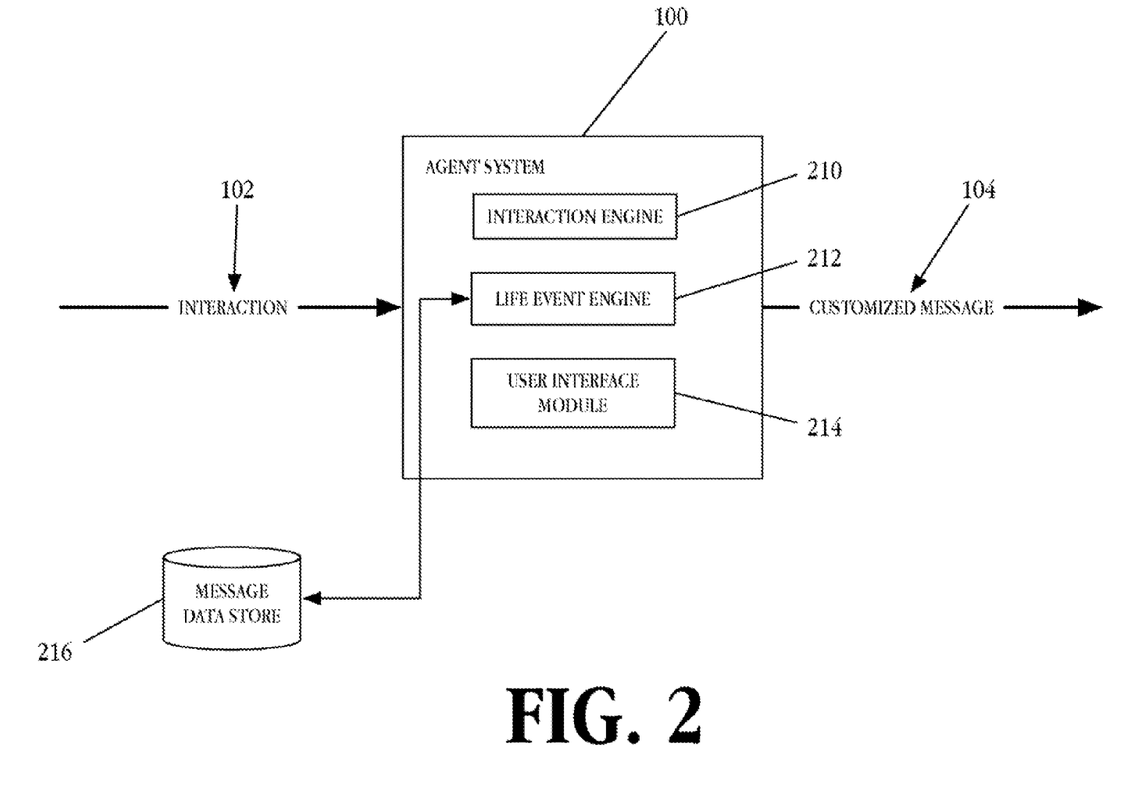
FIG. 2 shows a more detailed block diagram of an apparatus for providing a customized message to a customer, in accordance with an example embodiment.

FIG. 2 shows a more detailed block diagram of an apparatus for providing a customized message to a customer, in accordance with an example embodiment. In an embodiment, the agent system 100 includes an interaction engine 210, life event engine 212, and a user interface module 214. The agent system 100 receives and processes an interaction 102. As discussed above, the interaction may include an audio interaction, an audio/video interaction, a text interaction, or any combination thereof. In a further embodiment, the life event engine 212 is coupled to a life event data store 216. The life event data store 216 may be contained within the agent system 100 or coupled across a network to the life event engine 212.

In an embodiment, the interaction engine 210 is configured to enable interactions between a customer and an agent. The interaction engine is further configured, in some examples, to suspend the interaction. Suspending the interaction includes, without limitation, placing the customer on hold through any suitable means.

In an embodiment, the life event engine 212 is configured to retrieve a listing of life events from the life event data store 216. In one embodiment, the list of life events are a listing of pre-determined life events, such that no modification during the interaction with the customer can be made. One advantage of such an arrangement is that the listing of life events can be standardized across a plurality of agents.

In an embodiment, the user interface module 214 is configured to display the listing of life events retrieved by the life event engine 212. In a further embodiment, the user interface module 214 receives a life event indication from the agent. The life event indication is passed to the life event engine 212 and is used in the selection of a life event message to be played to the customer during the suspension of the interaction. For example, if the agent, during the interaction with the customer, determines that the customer has recently had a baby, the agent selects the baby life event from the listing displayed by the user interface module 214 and the life event engine 212 passes that selection to the interaction engine 210. In this example, the interaction engine 210 using the baby life event sends instructions to the call center system that cause the call center system to play a message regarding a product or service that may be pertinent to that life event. For example, the product could be a college savings account which provides a mechanism by which the customer can provide for the new baby's college education. Other examples of products that are related to life events include, without limitation: increased life insurance may be related to a new baby; increased life insurance may be related to a marriage; retirement account may be related to a new job or change in a current job; will may be related to a new baby or a deployment or a marriage; and the like. This is by no means an exhaustive list of product to life event mappings. Any financial product or service that is related to any life event is considered to be within the scope of the present discussion.

Reference has been made with respect to this discussion to an agent interacting with the customer. Though such reference has been made, the present discussion is not limited to human to human interaction and may include an interaction with a computerized system. However, the applicability of the modules described here may be limited to interactions where some delay may be present. One example of such interaction in the context of an interaction between a human and a computerized system may be the retrieval of account information. During the delay in the request for the information and the final display of the information, a message customized for a life event may be displayed, or played, to the customer.

Figure 3:
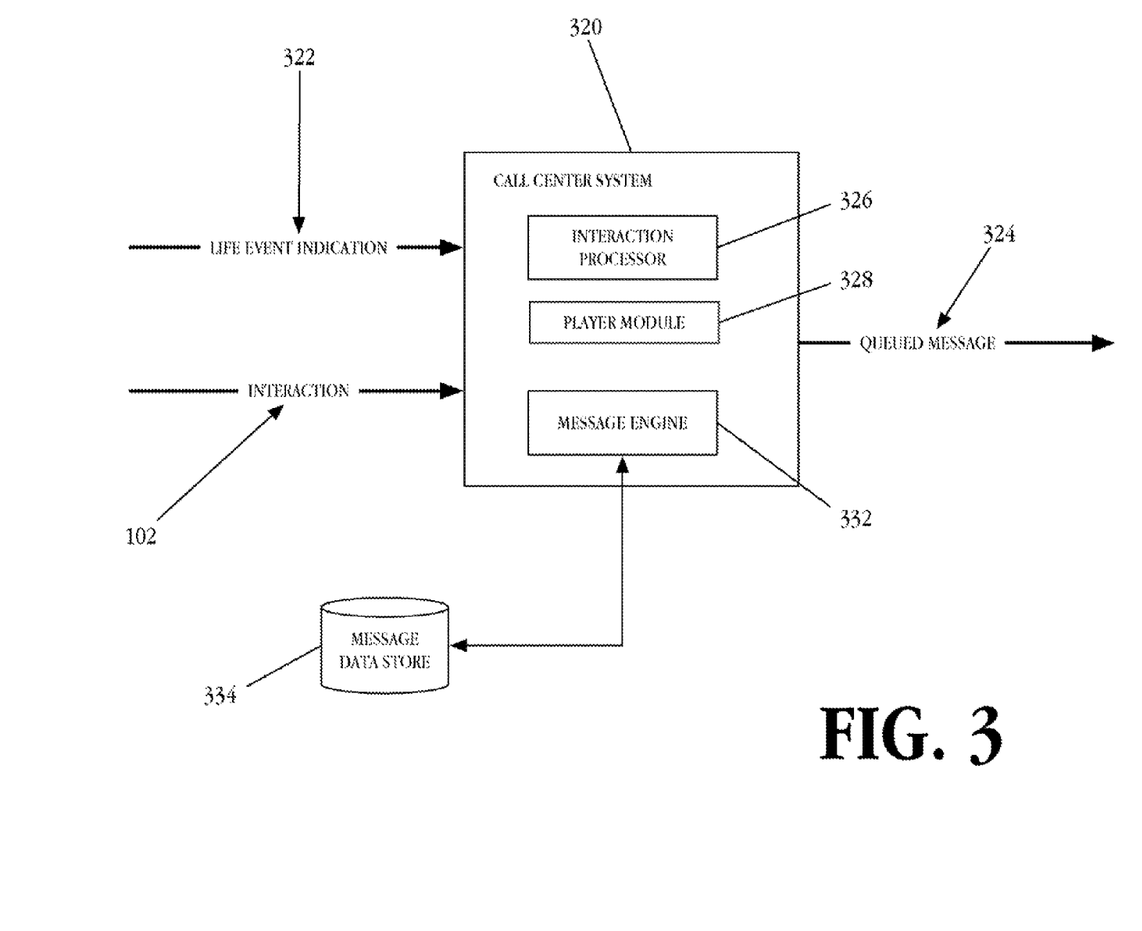
FIG. 3 shows a block diagram of an apparatus for providing a customized message to a customer, in accordance with an example embodiment.

FIG. 3 shows a block diagram of an apparatus for providing a customized message to a customer, in accordance with an example embodiment. As discussed above with respect to FIG. 1 and FIG. 2, the agent system 100 may be one of a plurality of agent systems and the agent operating the agent system 100 may be one of a plurality of agents. In such an arrangement, interactions 102 with customers are first received by a call center system 320. The call center system 320 provides a single interface to the customers. Once an interaction 102 is received by the call center system 320, the interaction is sent to an appropriate agent system 100. Appropriate may mean the agent system 100 that is the most available or the agent system 100 that is dedicated to servicing that particular customer or that particular customer's needs.

In an embodiment, the call center system 320 includes an interaction processor 326, a player module 328, and a message engine 332. In a further embodiment, the message engine 332 is coupled to a message data store 334. The message data store 334 maintains a plurality of messages capable of being played by the player module, each of the plurality of messages is a life event message. The call center system 320 receives, as discussed above, an interaction 102 from a customer. Referring back to FIG. 1 and FIG. 2, the interaction 102 received by the agent system is similar to that received by the call center system 320 except that the interaction is first received by the call center system 320 and is then passed to the appropriate agent system 100.

The call center system 320 can additionally receive a life event indication 322 as an input in some examples. In one embodiment, the life event indication is received from the agent system 100 while the agent system 100 is processing an interaction with a customer. In an alternate embodiment, the life event indication is stored during such an interaction, but retrieved as an input at some time in the future. For example, the agent operating the agent system 100 notes that the customer has recently had a baby and inputs that information. The customer experiences no suspension of their interaction with the agent, but calls back several days or weeks later requesting other information or services. At that later interaction, the call center system 320 retrieves the previously stored life event indication 322 as an input, which is then used by the call center system 320.

In an embodiment, the interaction processor 326 is configured to manage interactions between customers and agents. One example of managing includes routing incoming interactions 102 to an appropriate agent for further processing. A further example of managing includes monitoring the interactions that are bring processed by the agents to calculate an approximate wait time until an agent can process the interaction 102.

In an embodiment, the player module 328 is configured to play any suitable message to the customer. This may include an automated message welcoming the customer. Additionally, the player module 328 may play dynamically generated messages such as approximate wait time, as calculated by the interaction processor, until they are attended to by an agent.

In an embodiment, the message engine 332 is configured to retrieve one or more customized messages from the message data store 334. The one or more customized messages can be passed to the player module 328 and then played for the customer. The message engine 332 may be further configured, in some embodiments, to receive an indication regarding the identity of the customer and retrieve one or more messages specific to a life event of the customer. In such an example, a previously stored life event is used to determine which of the one or more messages in the message data store to retrieve. The one or more messages retrieved can then be queued for playback and used if the customer is required to wait to be connected to an agent.

In an embodiment, the one or more messages retrieved by the message engine can be output by the call center system 320 as queued messages 324. In some examples, the queued messages 324 may never be played to the customer as the wait time, as discussed above, may be so minimal that a message can not be played. However, even in this example, the queued message 324 can remain and used at a later time if the customer does experience any other delay. Alternatively, the queued message 324 can be used during the customer's next interaction with the call center system 320 as soon as the customer is identified.

Figure 4A:
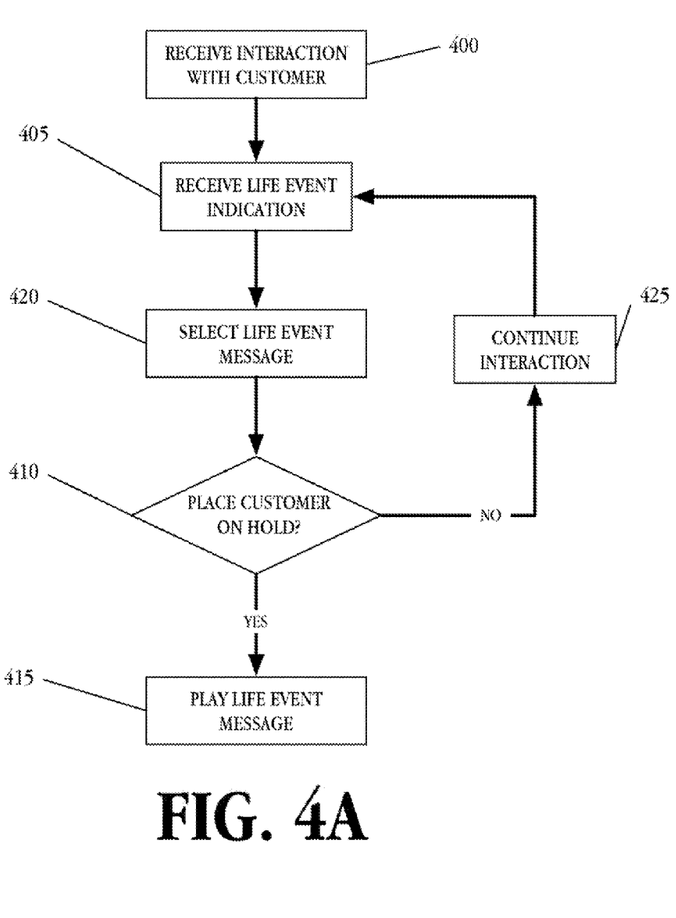
FIG. 4A shows a flowchart of a method for providing a customized message to a customer, in accordance with an example embodiment.

FIG. 4A shows a flowchart of a method for providing a customized message to a customer, in accordance with an example embodiment. In an embodiment, the method of FIG. 4A may be carried out at an agent system 100, such as that depicted in FIG. 1 and FIG. 2.

At block 400, an interaction is received from a customer. As discussed above this may include, without limitation, an audio interaction, an audio/video interaction, a textual interaction, or any combination thereof. During the interaction, one or more life events are noted. A life event indication related to each of the one or more life events is received by the agent system at 405. As discussed above, during the interaction it may become necessary to suspend the interaction or place the customer on hold. If the customer is placed on hold at block 410, a life event message can be played to them at block 415. In an alternate embodiment, the life event message can be queued following the receipt of the life event indication at block 405 and then played during any suspension of the interaction.

At block 405, a life event indication is received. In one embodiment, the life event indication is received through the user interface module as described above with respect to FIG. 2. The life event indication, in some examples, is received from the user during an interaction with the agent. During the interaction, the agent interacting with the customer may notice one or more life events have occurred for the customer. This may be the result of the customer, on their own initiative, providing such information. It may alternatively be the result of active listening and further proving by the agent. In the latter example, the customer may be trying to increase the insurance coverage on their home. During the interaction, the agent can inquire as to the reason for the increase. One reason may be that an addition for a baby room is planned for the home. An engaged agent can quickly ascertain that a baby is on the way for that particular customer and input such life event into the agent system.

At block 420, one of a plurality of life event messages is selected. In an embodiment, the selection of a life event message is made using at least the life event indication. Other information may also be used in selecting the life event message. In the example provided above of the new baby, a life event message regarding other financial products to help parents provide for the new baby can be selected. Other information, in this example, could include information that the customer already has three other children. A life event message for this particular customer may be different then the customer who is having their first child.

Selecting a life event message at block 420 may include, in some embodiments, the agent selecting a life event from a listing of life events. In this example, the listing of life events can be standardized across multiple agents. One advantage of this arrangement is that the possibility of a first agent inputting "new baby," in the above example, while a second agent inputs "new infant," is reduced. Through such operations, the agent system can select life event messages based on a predetermined listing of life events. The life event messages are retrieved from a data store of life event messages. As discussed above with respect to FIG. 3, the message data store may be coupled to the call center system or contained within the call center system. The life event message selected at block 420 is played to the customer at block 415, in some examples. In an alternate embodiment, the life event messages selected at block 420 is selected following the receipt of any life event indication at block 405. The selection is stored by the agent system for later use during any suspension of the interaction between the customer and the agent. In such an embodiment, the customer is not put on hold at block 410 and the interaction continues at block 425. During the continued interaction with the customer, the agent may receive further life event indications at block 405.

In a further embodiment, the data store of life event messages includes at least one life event message that can be dynamically generated. An example of such a message includes a message regarding life insurance. For a customer with existing life insurance that has recently had a new baby, a life event message regarding increased life insurance coverage may be appropriate. Using a dynamically generated message, the current life insurance coverage can be conveyed to the customer and information about how much more coverage is needed with the new baby can be provided. This information can be dynamically retrieved when the life event message is selected by including retrieval information in the stored message.

One example of a dynamically generated message may include:

<Life Event Message-New Baby>
<Play Text>
"Congratulations on the addition to your family. One aspect of caring for your new baby is to provide for them in the event of your death. Currently you have <SAY INSURANCE COVERAGE> in coverage. It may be a good idea, considering your new baby, to increase your coverage to <SAY 7 TIMES ANNUAL SALARY>. Talk to your Member Service Representative about how you can take care of that today.
</Play Text> where the actual text of the message is pre-recorded, or synthesized using a text-to-speech engine, but the portions of the message marked <SAY> include information that is retrieved at the time the message is played and then synthesized using a text-to-speech engine. Use of such dynamically generated information in a life event message allows the call center system 320, or the agent system 100, to tailor the life event messages to the exact status of an individual customer.

Figure 4B:
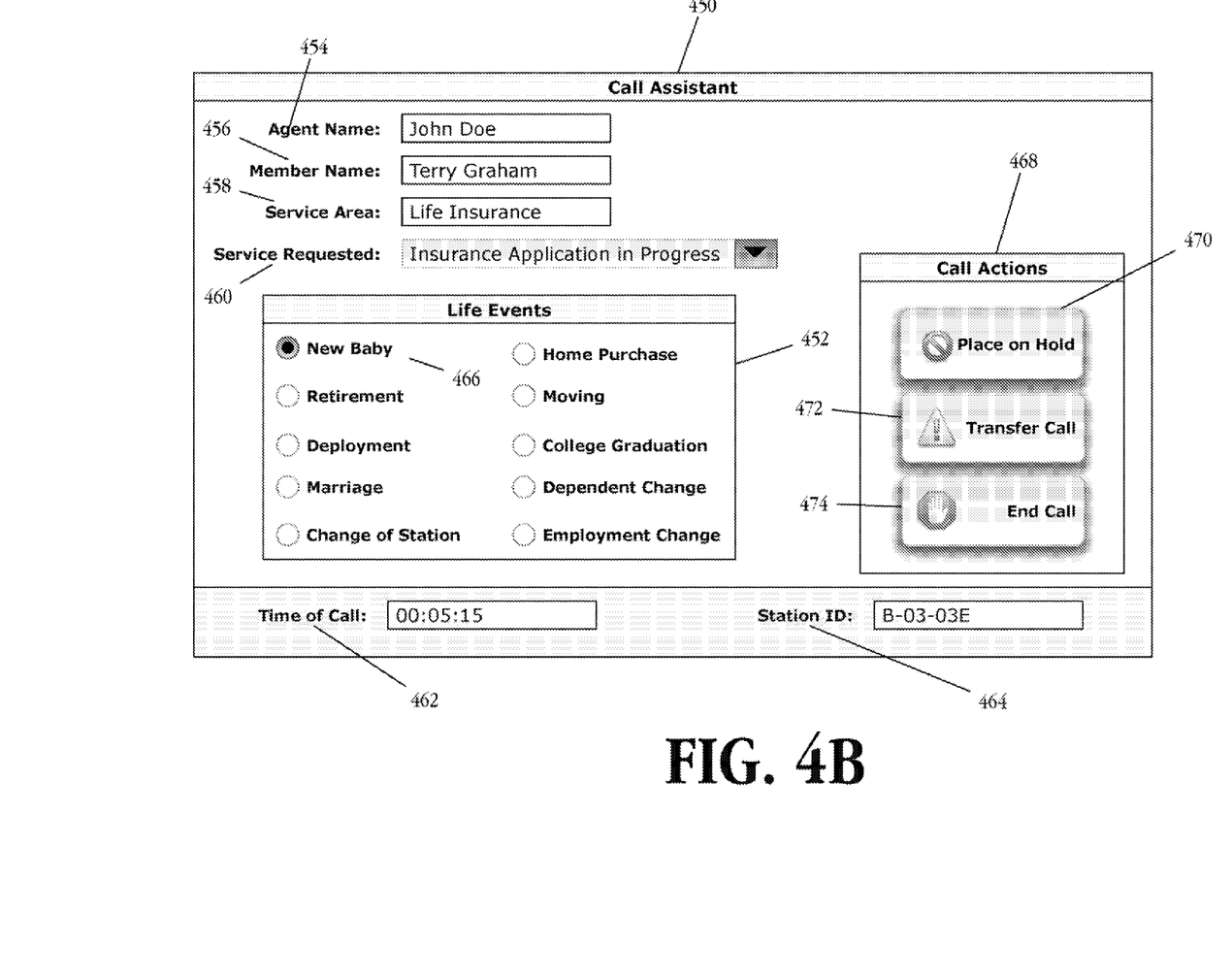
FIG. 4B shows an example user interface screen for selecting a life event indication, in accordance with an example embodiment.

FIG. 4B shows an example user interface screen for selecting a life event indication, in accordance with an example embodiment. As discussed above with respect to FIG. 4A, a user interface screen can be displayed to the agent by the user interface module. FIG. 4B provides an example user interface, in accordance with example embodiments, to be displayed on the agent system by the user interface module 214. Through this user interface, the agent selects one or more of the life event indications.

In an embodiment, the user interface window, or call assistant 450, includes one or more life event indications for selection in a Life Events 452 window. The call assistant 450 may also include forms, which when filled out, provide the agent the ability to enter, without limitation, the agent name 454, the member name 456 (in this example, the member refers to the customer discussed above), the service area 458 (referring to one of a plurality of business offerings), and the service requested 460. The call assistant 450 may also include the total time of the call 462, in some examples. Additionally, the call assistant 450 may note within the user interface the station ID 464.

In an embodiment, the agent can select one or more life events in the Life Events 452 window. In this example, the "New Baby" 466 life event is selected. The agent is processing the member's application for insurance as indicated in the service requested 460 indication, but through active listening and probing of what has lead the member to need new or more insurance has learned that the member is having a new baby. The agent can then select the "New Baby" 466 life event, as indicated in FIG. 4B. As discussed above, it may become necessary for the agent to place the member, or customer on hold, during some point in the interaction. The Call Actions 468 window provides within the same Call Assistant window 450 the functionality to perform a variety of actions on the call. As will be discussed below, the agent system 100 providing this user interface may be coupled to a phone system or to any other device enabled to interact with the customer. In the Call Actions 468 window, the agent can select to either place the customer on hold 470, transfer the call 472 to another agent if needed, or end the call 474. Placing the customer on hold through the selection of the Place on Hold 470 button, and using the systems and methods described herein, can result in the playing of a message customized to a life event for that customer. In the instant example, the member would be played a life event message related to a new baby, such as the benefits of setting up a college fund.

Figure 5:
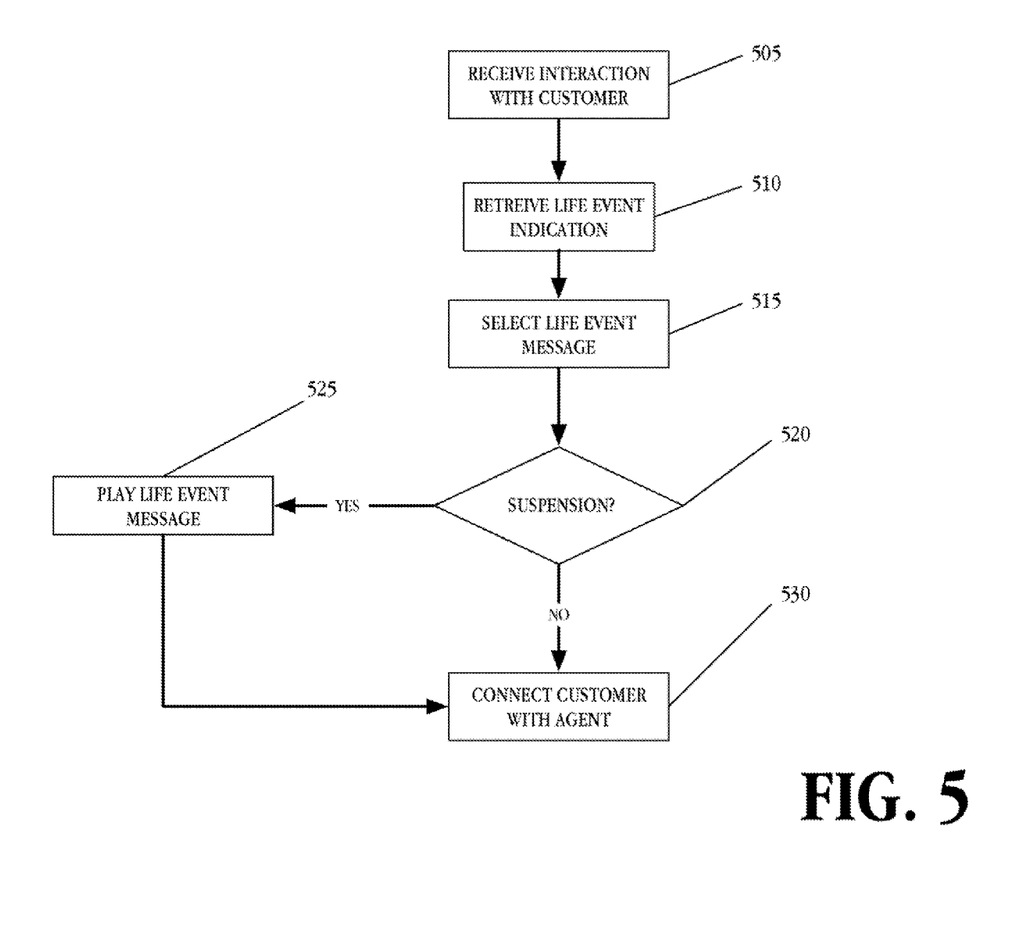
FIG. 5 shows a flowchart of a method for providing a customized message to a customer, in accordance with an example embodiment.

FIG. 5 shows a flowchart of a method for providing a customized message to a customer, in accordance with an example embodiment. In an embodiment, the method depicted in FIG. 5 and described here may be carried out by the call center system 320 shown in FIG. 3 and described above.

At block 505 an interaction with a customer is received. In one embodiment, the customer, during the initiation of the interaction, provided identifying information about themselves. In an alternate embodiment, the customer can be identified by using information regarding the interaction, such as the phone number from which the customer is calling. Using such information, the call center system 320 can retrieve further information associated with the customer.

At block 510, a life event indication is retrieved. In one embodiment, the life event indication is stored during a prior interaction with the customer. In such an example, the customer interacted with an agent about a product or service during which the agent noted that a life event had occurred for the customer. The agent, at that time, made such an indication through the agent system. During operations at block 510, such prior indication is retrieved. In an alternate embodiment, the life event indication retrieved at block 510 is dynamically determined. For example, following receipt of the interaction at block 505, the call center system 320 retrieves present account status information with regards to the customer and using one or more rules calculates the likelihood that the customer has experienced a life event. This may be based on any number of factors, such as the addition of a beneficiary identified as spouse (change in marital status), the removal of a beneficiary identified as spouse (change in marital status), the automatic deduction of funds from a financial account to satisfy a recurring mortgage payment (buying a house), a change in military rank, change in address (permanent change of station or separation from the military). As will be understood by those skilled in the art, these are provided only as examples and do not represent an exhaustive list of rules. Any computerized method that does not rely on an agent entering a life event indication into an agent system is considered to be within the scope of dynamically determining a life event indication.

At block 515, a life event message is selected from a plurality of life event messages. The plurality of life event messages are stored in a message data store, as described above, in one example. The life event message selected at block 515 is selected using an identifier associated with the customer to retrieve either one or more life event indications associated with the user or other information regarding the customer. In the former example, a life event message customized to respond to the one or more life event indications can be selected. In the latter example, some identifying characteristic of the customer can be used to select the life event message. Such identifying characteristics may include, without limitation: age, marital status, number of children, location, military rank, and the like. These are only meant as examples and in the context of the present discussion; any identifying characteristic that is not unique to the customer but applies to multiple customers can be used. Through such a mechanism, a life event message can be delivered to those multiple customers, that life event message specifically targeted towards the needs of that group of customers.

Alternatively, at block 515, the life event message can be selected from the plurality of life event messages based on unique information regarding the customer, including, but not limited to, life event indications. For example, the customer has recently had a baby but already has more than enough life insurance coverage based on the seven times annual salary rule of thumb used by financial planners. The call center system 515 can use that information to not select a life event message regarding life insurance, but choose instead a life event message regarding a college education fund or First Start Savings account.

At block 520, the call center system 320 makes a determination as to whether the interaction requires a suspension prior to processing by an agent. This determination may be made based on the average time prior to processing, or any other suitable metric. In an alternate embodiment, the determination at block 520 is made with regards to the ability to play the selected life event message. For example, if the call center system determines that the customer will need to wait three minutes before being connected and the selected life event message is two minutes long, the call center system 320 can choose to play the selected life event message at block 525. Alternately, the call center system 320 can re-select a life event message at block 515 using the expected time to wait before the customer can be connected to the agent.

At block 530, the call center system 320 connects the customer to the agent. In one embodiment, the call center system 320 connects the customer to the agent after the life event message has been completely played. In another embodiment, the call center system 320 after playing the selected life event message at block 525 may select and retrieve additional life event messages to be played at block 525. In an alternate embodiment, the call center system 320 terminates the playing of the life event message and connects the customer to the agent when the agent becomes available. In the latter example, the agent, upon completion of the interaction with the customer, may ask the customer if they wish to return to the previously playing life event message. In a further embodiment, the life event message that they return to is played from a point prior to that point reached during the previous playing. This is advantageous when the interaction with the agent is a lengthy one. If the customer was returned to exactly the same point, they may be lost for a period of time as to what was being previously conveyed. By starting at some prior point, they can better comprehend what is being conveyed to them. In yet a further embodiment, the life event message is played from the beginning.

Figure 6:
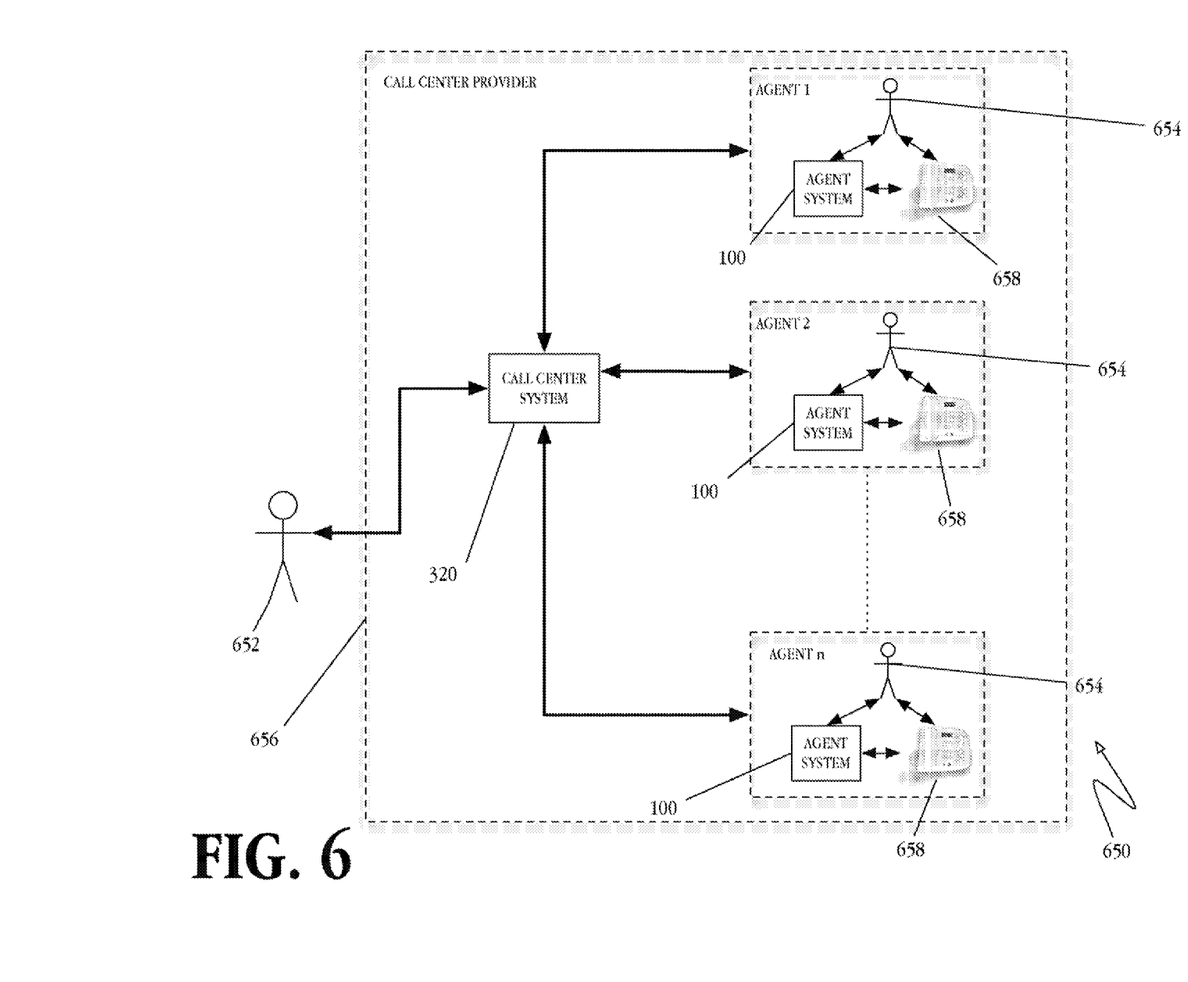
FIG. 6 shows a block diagram of a system that provides customized messages to customers, in accordance with an example embodiment.

FIG. 6 shows a block diagram of a system that provides customized messages to customers, in accordance with an example embodiment. The system 650 includes a customer 652 interacting with one or more agents 654. The one or more agents are employed by a call center provider 656 which operates a call center system 320, the call center system 320 receiving interactions from customers and routing them to the appropriate agent 654. Each of the agents 654 operates an agent system 100 which is coupled to the call center system 320. In a further embodiment, the agent 654 interacts with the customers through a phone system 658 which is coupled to the agent system 100 and is in turn communicatively coupled to the customer through the call center system 320.

The customer 652 in this example is calling into the call center provider 656 to make a change to one of their financial products which is maintained by the call center provider 656. In this example, the financial account is maintained by the same entity that operates the call center system 320. Alternatively the entity maintaining the financial accounts of the customer may be distinct from the entity operating the call center system 320. The call center system 320 receives the call from the customer 652 and connects the customer to an agent 654. During the conversation with the customer, the agent notes that the customer has recently had a baby. At some point in the conversation with the customer, the agent finds a need to place the customer on hold to obtain information from another source. Prior to placing the customer on hold, the agent selects on their agent system the "new baby" life event. The customer, while on hold, is played a life event message related to financial products or services applicable to someone with a new baby. Alternately, as soon as the agent is aware that the customer has had a new baby, they input that life event indication into the agent system. In either example, the life event indication is provided to the call center system 320 for storage and processing.

Figure 7:
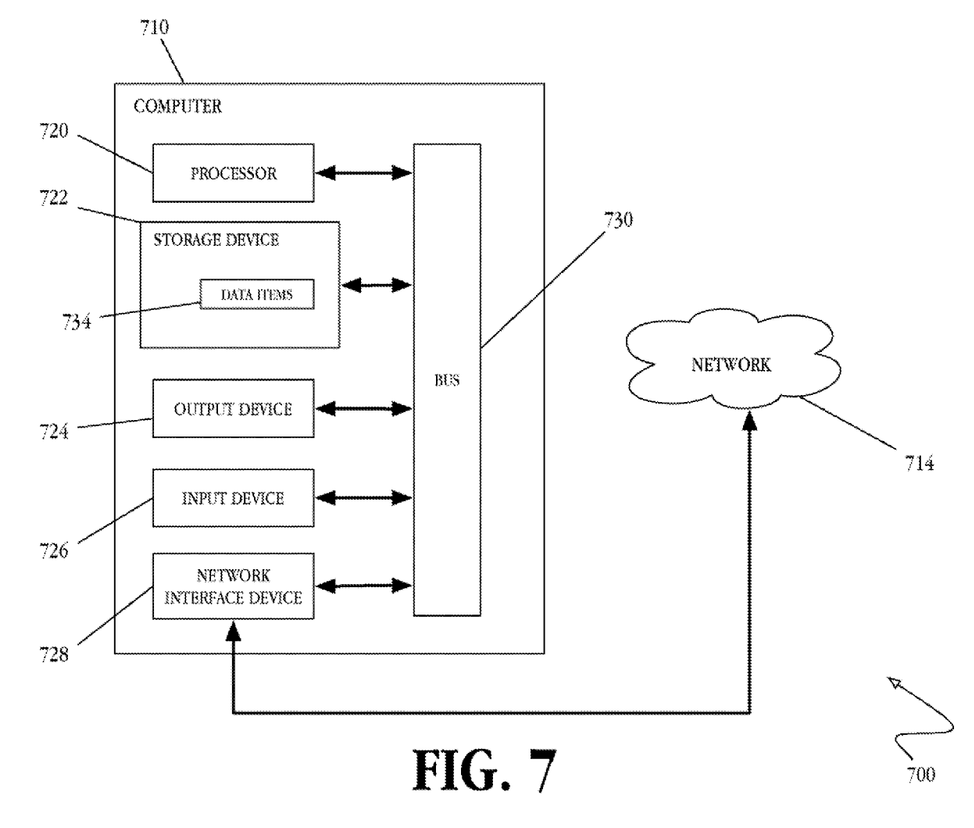
FIG. 7 shows a block diagram of a machine including instructions to perform any one or more of the methodologies described herein.

FIG. 7 shows a block diagram of a machine including instructions to perform any one or more of the methodologies described herein. A system 700 includes a computer 710 connected to a network 714. The computer 710 includes a processor 720, a storage device 722, an output device 724, an input device 726, and a network interface device 728, all connected via a bus 730. The processor 720 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 720 executes instructions and includes that portion of the computer 710 that controls the operation of the entire computer. Although not depicted in FIG. 7, the processor 720 typically includes a control unit that organizes data and program storage in memory and transfers data and other information between the various parts of the computer 710. The processor 720 receives input data from the input device 726 and the network 714 reads and stores code and data in the storage device 722 and presents data to the output device 724.

Although the computer 710 is shown to contain only a single processor 720 and a single bus 730, the disclosed embodiment applies equally to computers that may have multiple processors and to computers that may have multiple busses with some or all performing different functions in different ways.

The storage device 722 represents one or more mechanisms for storing data. For example, the storage device 722 may include read-only memory (ROM), random access memory (RAM), magnetic disk storage media, optical storage media, flash memory devices, and/or other machine-readable media. In other embodiments, any appropriate type of storage device may be used. Although only one storage device 722 is shown, multiple storage devices and multiple types of storage devices may be present. Further, although the computer 710 is drawn to contain the storage device 722, it may be distributed across other computers, for example on a server.

The storage device 722 includes a controller (not shown in FIG. 7) and data items 734. The controller includes instructions capable of being executed on the processor 720 to carry out the functions, as previously described above with reference to FIGS. 1-6. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 722 may also contain additional software and data (not shown), which is not necessary to understand the invention.

Although the controller and the data items 734 are shown to be within the storage device 722 in the computer 710, some or all of them may be distributed across other systems, for example on a server and accessed via the network 714.

The output device 724 is that part of the computer 710 that displays output to the user. The output device 724 may be a liquid crystal display (LCD) well-known in the art of computer hardware. But, in other embodiments the output device 724 may be replaced with a gas or plasma-based flat-panel display or a traditional cathode-ray tube (CRT) display. In still other embodiments, any appropriate display device may be used. Although only one output device 724 is shown, in other embodiments any number of output devices of different types, or of the same type, may be present. In an embodiment, the output device 724 displays a user interface.

The input device 726 may be a keyboard, mouse or other pointing device, trackball, touchpad, touch screen, keypad, microphone, voice recognition device, or any other appropriate mechanism for the user to input data to the computer 710 and manipulate the user interface previously discussed. Although only one input device 726 is shown, in another embodiment any number and type of input devices may be present.

The network interface device 728 provides connectivity from the computer 710 to the network 714 through any suitable communications protocol. The network interface device 728 sends and receives data items from the network 714.

The bus 730 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 710 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 710. For example, other peripheral devices such as audio adapters or chip programming devices, such as EPROM (Erasable Programmable Read-Only Memory) programming devices may be used in addition to, or in place of, the hardware already depicted.

The network 714 may be any suitable network and may support any appropriate protocol suitable for communication to the computer 710. In an embodiment, the network 714 may support wireless communications. In another embodiment, the network 714 may support hard-wired communications, such as a telephone line or cable. In another embodiment, the network 714 may support the Ethernet IEEE (Institute of Electrical and Electronics Engineers) 802.3x specification. In another embodiment, the network 714 may be the Internet and may support IP (Internet Protocol). In another embodiment, the network 714 may be a local area network (LAN) or a wide area network (WAN). In another embodiment, the network 714 may be a hotspot service provider network. In another embodiment, the network 714 may be an intranet. In another embodiment, the network 714 may be a GPRS (General Packet Radio Service) network. In another embodiment, the network 714 may be any appropriate cellular data network or cell-based radio network technology. In another embodiment, the network 714 may be an IEEE 802.11 wireless network. In still another embodiment, the network 714 may be any suitable network or combination of networks. Although one network 714 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A non-transitory machine-readable medium having machine executable instructions for dynamically playing a message customized for a particular customer contained therein, the machine-executable instructions performing the following operations:
   retrieving financial account status information of a user during an interaction with the user;
   receiving a life event indication from a user during the interaction with the user;
   suspending the interaction for a period of time;
   playing one of a plurality of life event messages during the suspension, the one of a plurality of life event messages selected from the plurality of life event messages using at least the life event indication and the account status information; and
   resuming the interaction after the one of the plurality of life event messages has been completely played.

2. The machine-readable medium of claim 1, wherein playing one of a plurality of life event messages includes:
   selecting a life event from a listing of life events; and
   retrieving one or more of the plurality of life event messages from a data store of life event messages.

3. The machine-readable medium of claim 2, wherein the listing of life events include life events that are associated with a financial services product.

4. The machine-readable medium of claim 3, wherein the listing of life events includes at least one of the following: birth of a baby, change in marital status, deployment, retirement from military, retirement not from military, separation from military, enlistment or commission in military, moving or change in job.

5. The machine-readable medium of claim 2, wherein the listing of life events includes a listing of one or more of a subset of predetermined life events.

6. The machine-readable medium of claim 1, wherein the plurality of life event messages includes at least one life event message that is pre-recorded.

7. The machine-readable medium of claim 1, wherein the plurality of life event messages includes at least one message that is dynamically generated using present information regarding the user and the life event indication.

8. A non-transitory machine-readable medium having machine executable instructions for dynamically playing a message customized for a particular customer contained therein, the machine-executable instructions performing the following operations:
   selecting a life event message using at least an identifier and financial account information associated with the customer, the life event message selected from a plurality of life event messages;
   suspending an interaction with the customer for a period of time;
   playing the selected life event message during the suspension; and
   resuming the interaction after the selected life event message has been completely played.

9. The machine-readable medium of claim 8, wherein selecting a life event messages includes:

selecting a life event message using at least an identifier and financial information associated with the customer, the life event message selected from a plurality of life event messages using a previously stored life event indication.

10. The machine-readable medium of claim 9, wherein the life event indication is received by an agent.

11. The machine-readable medium of claim 9, wherein the life event indication is dynamically determined.

12. The machine-readable medium of claim 8, wherein playing the selected life event message includes:
   receiving a request for an interaction from the customer;
   playing the selected life event message to the customer; and
   connecting the customer to a resource associated with the request.

13. The machine-readable medium of claim 12, wherein the life event message is additionally selected using an estimated time between the receipt of the request and the connection with the resource.

14. The machine-readable medium of claim 8, wherein playing the selected life event message includes:
   receiving an interaction from the customer; and
   playing the selected life event message while processing the interaction.

15. A non-transitory machine-readable medium having machine-executable instructions for dynamically delivering customized messages to a customer executable by the machine to cause the machine to:
   cause a number of software modules to be executed including:
      an interaction engine to enable interactions between a customer and an agent, including an interface module configured to suspend an interaction with the customer and concurrently send instructions to a call center system, the instructions intended to cause the call center to play a life event message during the suspension;
      a user interface module to display a listing of pre-determined life events to the agent, and to receive a life event indication from the agent; and
      a life event engine to retrieve the listing of pre-determined life events from a life event data store, to select a life event message using the life event indication received and the financial account information and to provide the selected life event message to the interface module; and
   a call center system to resume the interaction after the selected life event message has been completely played.

16. The machine-readable medium of claim 15, wherein the interaction with the customer is an audio interaction with the customer enabled through a public-switched telephone network (PSTN).

17. The machine-readable medium of claim 15, wherein the interaction with the customer is an audio interaction with the customer enabled through a Voice-over-IP (VoIP) connection.

18. The machine-readable medium of claim 15, wherein the interaction with the customer is a video interaction with the customer.

19. The machine-readable medium of claim 15, wherein the interaction with the customer is a text or text and voice interaction enabled through any suitable instant messaging client network.

20. The machine-readable medium of claim 15, wherein the life event message is stored in a life event data store coupled to the call center system, the life event data store containing a plurality of life event messages.

21. The machine-readable medium of claim 20, wherein at least one of the plurality of life event messages is a pre-recorded life event message.

22. The machine-readable medium of claim 20, wherein at least one of the plurality of life event messages is created dynamically through the use of present information associated with the customer.

* * * * *